(12) United States Patent
Au

(10) Patent No.: US 6,994,556 B2
(45) Date of Patent: Feb. 7, 2006

(54) ELECTRONIC EDUCATIONAL APPARATUS INCORPORATING THE DETECTION OF OBJECTS

(75) Inventor: Ip Sing Au, Hong Kong (CN)

(73) Assignee: VTech Electronics, Ltd., TaiPo (HK)

( * ) Notice: Subject to any disclaimer, the term of this patent is extended or adjusted under 35 U.S.C. 154(b) by 269 days.

(21) Appl. No.: 10/051,272

(22) Filed: Jan. 18, 2002

(65) Prior Publication Data

US 2003/0138766 A1 Jul. 24, 2003

(51) Int. Cl.
*G09B 25/00* (2006.01)

(52) U.S. Cl. .................. 434/365; 434/156; 434/169; 446/153; 446/175; 446/297; 446/484; 273/455

(58) Field of Classification Search .................. 434/156; 273/440, 444–445, 447, 448, 454–456; 446/153–154, 446/175, 297–303, 484, 127–139
See application file for complete search history.

(56) References Cited

U.S. PATENT DOCUMENTS

| | | | | |
|---|---|---|---|---|
| 2,909,868 A | * | 10/1959 | Lewis | 446/139 |
| 4,348,191 A | * | 9/1982 | Lipsitz et al. | 434/308 |
| 4,526,550 A | * | 7/1985 | Lurito | 434/340 |
| 4,820,233 A | * | 4/1989 | Weiner | 446/303 |
| 4,968,255 A | * | 11/1990 | Lee et al. | 434/159 |
| 5,127,869 A | * | 7/1992 | Hanzawa | 446/397 |
| 5,297,355 A | * | 3/1994 | O'Brien | 43/4 |
| 5,334,022 A | * | 8/1994 | Kitagawa et al. | 434/340 |
| 5,346,399 A | * | 9/1994 | Sakow | 434/201 |
| 5,349,129 A | * | 9/1994 | Wisniewski et al. | 84/600 |
| 5,364,272 A | * | 11/1994 | Herman et al. | 434/159 |
| 5,639,093 A | * | 6/1997 | Law et al. | 273/371 |
| 5,906,369 A | * | 5/1999 | Brennan et al. | 273/238 |
| 5,959,281 A | * | 9/1999 | Domiteaux | 235/454 |
| 6,022,025 A | * | 2/2000 | Chuang | 273/448 |
| 6,171,168 B1 | * | 1/2001 | Jessop | 446/297 |
| 6,227,931 B1 | * | 5/2001 | Shackelford | 446/268 |
| 6,292,780 B1 | * | 9/2001 | Doederlein et al. | 704/270 |
| 6,524,159 B1 | * | 2/2003 | Kawarizadeh | 446/397 |
| 6,659,836 B1 | * | 12/2003 | Yamasaki et al. | 446/175 |
| 2003/0171063 A1 | * | 9/2003 | Soto et al. | 446/167 |

* cited by examiner

*Primary Examiner*—Xuan M. Thai
*Assistant Examiner*—Cameron Saadat
(74) *Attorney, Agent, or Firm*—Greenberg Traurig, LLP

(57) ABSTRACT

An apparatus is provided for determining the identification of selected objects for use in connection with an electronic children's toy, which apparatus includes a plurality of objects, each of the objects including several object contact elements, and an identification member, including several member contact elements. The identification member is configured such that at least two of the member contact elements come into electrical contact with at least two of the object contact elements when the identification member is engaged with one of the objects, forming a complete electrical circuit. A processing unit associated with the identification member then is able to uniquely identify the particular object which is engaged with the identification member by means of an electrical signal generated by the processing unit. The processing unit then provides feedback to the user by audio, visual and/or tactile means corresponding to the particular object selected by the user.

4 Claims, 2 Drawing Sheets

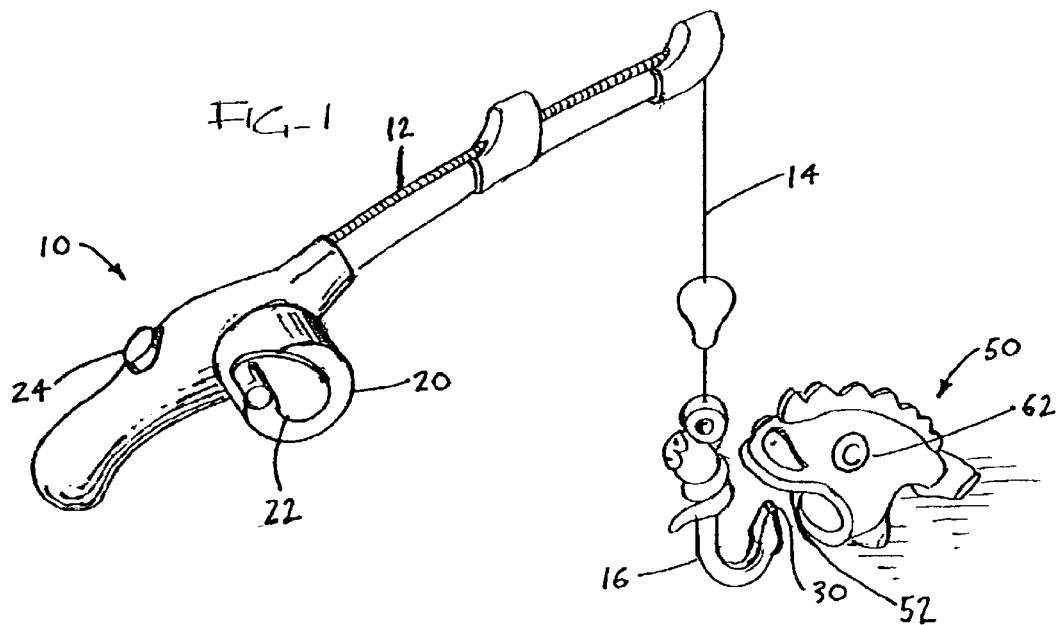
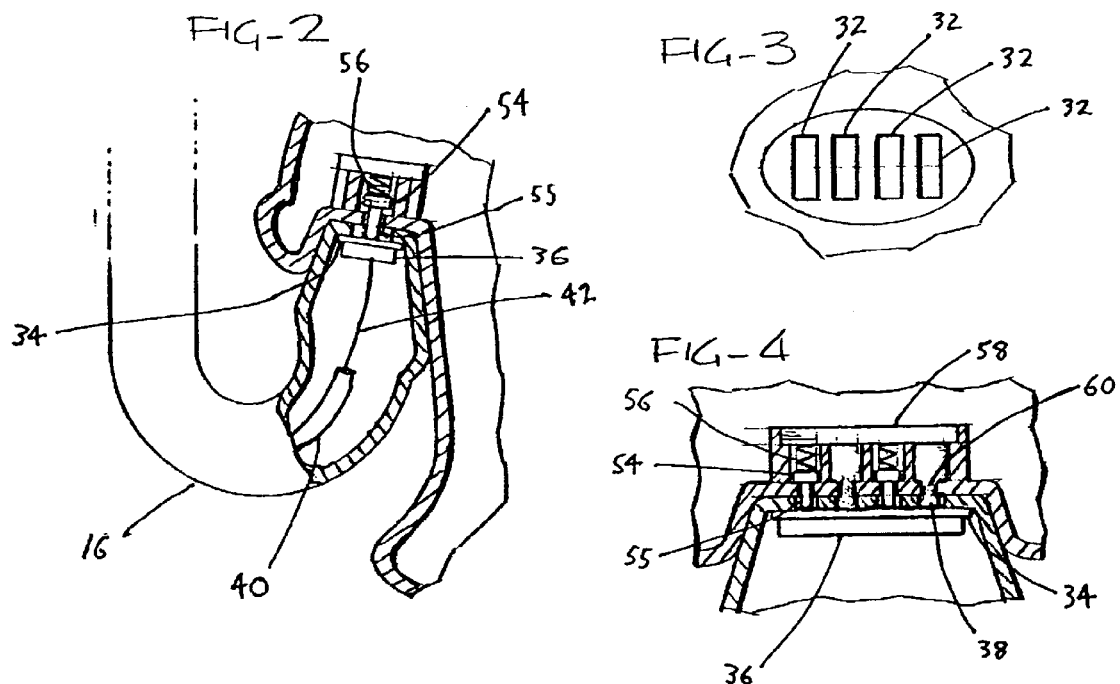
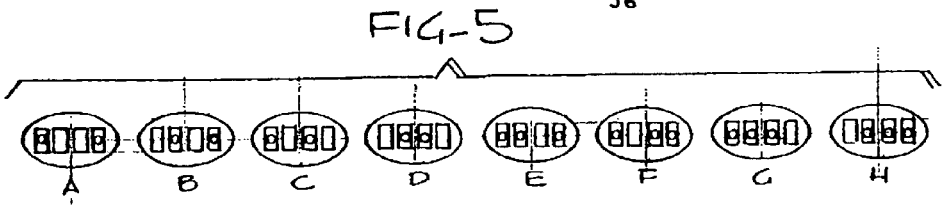

ELECTRONIC EDUCATIONAL APPARATUS INCORPORATING THE DETECTION OF OBJECTS

BACKGROUND OF THE DISCLOSURE

1. Field of the Invention

The present invention is directed to electronic children's toys and learning aids and, more specifically, an apparatus and method for determining the identification of selected objects used in connection with an electronic children's toy.

2. Background Art

Various apparatuses for detecting objects in connection with electronic children's toys are previously known in the art. For instance, Lee et al., U.S. Pat. No. 4,968,255 discloses an electronic instructional apparatus for use by children in which three-dimensional square blocks having varying patterns of notches and ridges on the edges thereof corresponding to indicia on a block face are placed within an cavity or recess within a base unit. A series of contact switches are located in bottom of the cavity such that the notches and ridges of the block edge engage with the contact switches and cause a particular combination of such switches to be actuated, depending on the pattern of notches and ridges found on the edge of the block placed within the input cavity. Each block face has an associated and unique pattern of notches and ridges formed on the peripheral edges of the face. When a block is inserted into a cavity, the learning apparatus is able to detect the identity of that particular block, specifically the indicia on the upward facing surface of the block, to the exclusion of all block faces, based on the unique combination of switches which are actuated. The apparatus then produces an audible response based on the identity of the block which was inserted. Accordingly, the apparatus may prompt the user with a question requiring insertion of a block bearing a particular indicia which responds to the question, such as a letter of the alphabet or a number. When the user inserts a block in response to the question, the apparatus is able to identify the block based on the pattern of switches which are depressed, and thereby determine whether the user has correctly responded to the question. The apparatus then generates an appropriate audible response to indicate to the user whether or not the question has been answered correctly.

One disadvantage of such a device as that disclosed by Lee et al. is that the class of objects which can be identified by the apparatus is limited to objects of a particular size and shape, as constrained by the size of the input cavity and the arrangement of the contact switches. Moreover, each of the objects inserted into the cavity must be of the same size and shape. Another potential disadvantage of such a device is that the contact switches are exposed, and therefore may be damaged, as it is often the case when young children expose such switches to food, liquids, excessive force, or other conditions which such switches are not able to tolerate.

It is therefore an object of the present invention to provide an apparatus for identifying objects in connection with an electronic children's toy in which the objects are not constrained to a particular size and shape, so as to allow for a greater variety of appearances of the objects used in connection with the apparatus.

It is a further object of the present invention to provide an apparatus which can give a child a greater learning experience by permitting the child to deal with objects of non-uniform size and shape.

It is also an object of the invention to provide such an apparatus which does not include exposed contact switches, thereby decreasing the likelihood of damage to the apparatus caused by a child's carelessness or abuse of the apparatus.

SUMMARY OF THE INVENTION

The invention comprises an apparatus for determining the identification of selected objects for use in connection with an electronic children's educational toy. The apparatus includes a plurality of objects, each of which includes a plurality of object contact elements, wherein two or more of the contact elements are connected to one another to form a contact pattern which serves to uniquely identify the associated object.

The apparatus also includes an identification member capable of being placed in physical contact with the object contact elements of each of the objects. The identification member includes a plurality of member contact elements, which are configured such that at least two of the member contact elements come into electrical contact with at least two of the object contact elements when the identification member is placed in physical contact with one of the objects.

The apparatus also includes a processing unit in electrical contact with the identification member. The processing unit is capable of detecting the object contact pattern that is in physical contact with the identification member, thereby determining the identification of the particular object in physical contact with the identification member.

The invention may include a means of providing information to the user by at least one of audio, visual and tactile means. Such information corresponds to the identification of the particular object that is in physical contact with the identification member. The means of providing information to the user may comprise, among others, computer-generated human speech and movement of a portion of the apparatus.

In one embodiment of the invention, the identification member includes at least three member contact elements which are arranged linearly. In this embodiment, each of the objects includes at least two contact elements arranged such that each of the object contact elements comes into electrical contact with a corresponding member contact element when an object is placed into physical contact with the identification member.

In an alternative embodiment of the invention, the identification member includes at least four contact elements arranged in at least two linear rows. Likewise in this embodiment, each of the objects includes at least two contact elements arranged such that each of the object contact elements comes into electrical contact with a corresponding member contact element when an object is placed into physical contact with the identification member.

In a further embodiment of the invention, an electronic children's educational toy comprises a fishing pole device, including a rod member and a hook member, and a plurality of objects, each of which includes a plurality of object contact elements wherein two or more of the contact elements are connected to one another to form a contact pattern which serves to uniquely identify the associated object. Each of the objects also includes an aperture configured so as to accept engagement of the hook member when the hook member is placed in physical contact with the object.

In this embodiment, an identification member associated with the hook member includes a plurality of member contact elements, which are configured such that at least two of the member contact elements come into electrical contact with at least two of the object contact elements when the hook member is placed in physical contact with one of the objects. In addition, a processing unit associated with the fishing pole device is in direct electrical contact with the identification member and is capable of detecting the object contact pattern in physical contact with the identification member, thereby determining the identification of the particular object in physical contact with the hook member.

This embodiment of the invention may also include a means of providing information to the user by at least one of audio, visual and tactile means. Such information corresponds to the identification of the particular object that is in physical contact with the identification member. The means of providing information to the user may comprise, among others, computer-generated human speech and movement of the hook member relative to the rod member.

The invention is also directed to a method for determining the identification of selected objects in connection with an electronic children's educational toy. First, an identification member including a plurality of electrically conductive contact elements is operably engaged with an object including a plurality of electrically conductive contact elements forming a unique contact pattern, such that at least two of the member contact elements and at least two of the object contact elements are brought into electrical contact with one another. Next, an electrical current is passed from the identification member to the object through at least one of the member contact elements and at least one of the object contact elements. Next, it is determined which of the member contact elements are conducting an electrical current, thereby also determining the contact pattern of the object which is in physical contact with the identification member. Finally, the object which is in physical contact with the identification member is identified based on the contact pattern of the object contact members.

A further embodiment of the invention includes indicating to the user by at least one of audio, visual and tactile means which of the objects is in physical contact with the identification member.

BRIEF DESCRIPTION OF THE DRAWINGS

FIG. 1 is a perspective view of a preferred embodiment of the apparatus of the present invention, showing a fishing pole device incorporating such an apparatus, in which the hook member of the fishing pole device is in close proximity with a fish-shaped object member.

FIG. 2 is a partial cross-sectional view of the hook member of the fishing pole device of FIG. 1 in operable engagement with the cavity portion of the object member.

FIG. 3 is a plan view of the end of the hook member of the fishing pole device of FIG. 1, showing the arrangement of member contact elements thereon.

FIG. 4 is a cross-sectional view of the end of the hook member of the fishing pole device of FIG. 1, showing the operable engagement between the member contact elements located on the end of the hook member and the object contact elements located within the cavity portion of the object member.

FIG. 5 is a series of diagrams showing eight unique object contact element patterns, relative to the arrangement of the member contact elements, as found in objects associated with the preferred embodiment of the present invention.

DETAILED DESCRIPTION OF THE DRAWINGS

Figure 6:
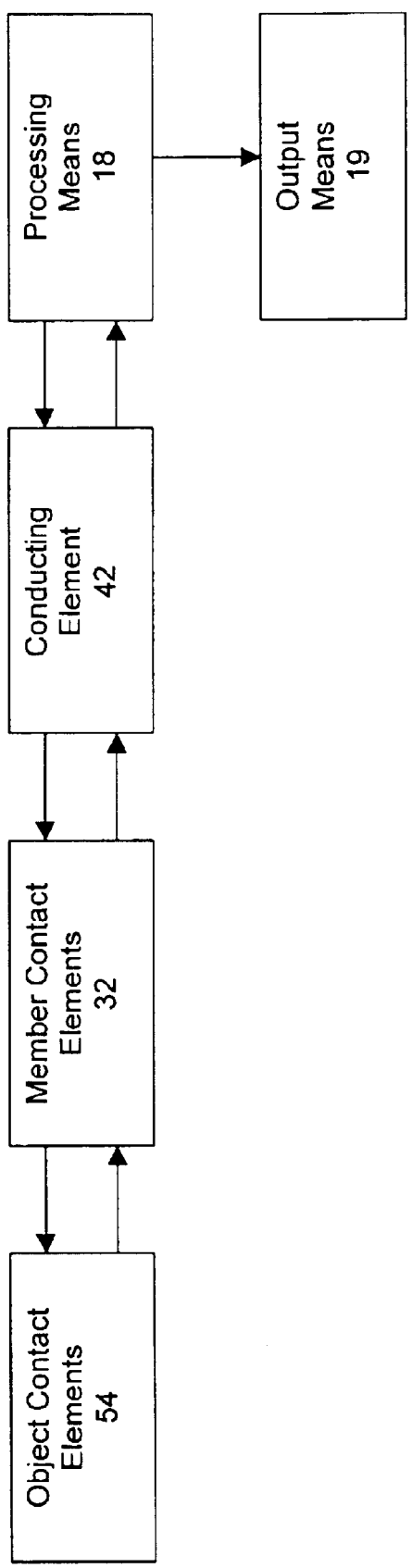
FIG. 6 is a block diagram showing the manner in which the apparatus of FIG. 1 identifies an object and then generates an output corresponding to the identity of the object.

While this invention is susceptible of embodiment in many different forms, there is shown in the drawings, and will be described in detail herein, one specific embodiment, with the understanding that the present embodiment is to be considered as an exemplification of the principles of the invention and is not intended to limit the invention to the embodiments illustrated.

The present invention is directed to an apparatus and method for detecting objects, such as typically would be found in an electronic children's educational toy. A preferred embodiment of the present invention is shown in FIGS. 1–6 as including fishing pole device 10 and object 50. Fishing pole device 10 includes a rod member 12, line portion 14, hook member 16, processing means 18, and output means 19. Line portion 14 further includes insulator element 40 and conducting element 42, where insulator element 40 consists of any flexible non-conducting material commonly known in the art for encasing electrical wires, and conducting element 42 consists of any electrically conductive material commonly known in the art for transmitting low-voltage current. Processing means 18 preferably consists of a microprocessor, as is well known to those skilled in the art, for processing and transmitting electrical signals, as described in more detail below. Output means 19 preferably consists of audio, visual, and/or tactile output devices, for example speakers, lights, and vibration devices, all of which are also well known to those skilled in the art. Fishing pole device 10 also includes a power source (not shown), preferably consisting of conventional alkaline-type batteries which may be easily replaced when needed.

Rod member 12 and hook member 16 are preferably constructed from plastic, or a similar inexpensive, durable material. Rod member 12 and hook member 16 are connected to one another by line portion 14, which is preferably retractable to allow for movement of hook member 16 to relative to rod member 12. Rod member 12 also includes reel 20, reel handle 22, and casting button 24, which provide for the simulation of casting and retrieving of line portion 14 by the user. Specifically, the user can depress button 24, which causes a retracted portion of line portion 14 within rod member 12 to be released. When combined with a swinging movement of fishing pole device 10 by the user, as in a conventional casting motion of an actual fishing rod, the force generated by hook member 16 will cause line portion 14 to be pulled outward from within rod member 12, thereby simulating an actual fishing cast. Similarly, reel 20 is preferably configured such that line portion 14 may be partially retracted by turning reel handle 22, again simulating the action of an actual fishing rod and reel.

Hook member 16 includes end 30, printed circuit board 34, magnet 36, and apertures 38. Circuit board 34 is in direct electrical contact with processing means 18 by means of conducting element 42. Circuit board 34 also includes a plurality of electrically conductive member contact elements 32 thereon, each of which member contact elements 32 is aligned with one of apertures 38. In the preferred embodiment, there are included four member contact elements 32 in a linear arrangement, as shown in FIG. 3. However, it is also contemplated that different numbers and/or arrangements of member contact elements 32 may be included as desired. For instance, a set of four member contact elements 32 could also be arranged in two linear rows of two contact elements each. Circuit board 34 is configured such that, when an electrically conductive material is brought into contact with any combination of two or more member contact elements 32 to form a complete electrical circuit, and an electrical signal is then transmitted therethrough, circuit board 34 will generate a unique signal corresponding to that particular combination of member contact elements, which will then be transmitted to processing means 18 by means of conducting element 42.

In the preferred embodiment of the invention, fishing pole device 10 is associated with a number of interchangeable objects 50, each of which can be uniquely identified (as described in more detail below) to the exclusion of the others. In the preferred embodiment shown, objects 50 have the appearance of fanciful fishes and other aquatic creatures, as in the exemplary object 50 shown in FIG. 1. However, object 50 may take any desired shape, so long as a suitable means of engagement with hook member 16 is provided. Each of objects 50 also preferably includes one or more identifying indicia 62, such as a letter, number or word printed on the surface thereof or a color associated therewith, which allows the user to select a particular desired object 50 from among all of the objects based on the cues provided by fishing pole device 10.

Object 50 includes cavity 52, which is configured so as to operably engage end 30 of hook member 16 when brought into proximity therewith. Object 50 also includes a plurality of object contact elements 54, conducting plate 58, and apertures 60. In the preferred embodiment, object contact elements 54 include pin members 55 and springs 56, which are composed of an electrically conductive material. Pin members 55 are biased outward by springs 56 so that pin members 55 protrude through apertures 60. When end 30 of hook member 16 is placed within cavity 52, an attractive force is exerted on pin members 55 by magnet 36, thereby causing pin members 55 to come into physical contact with member contact elements 32, as seen in FIG. 4.

The number of possible objects 50 which are capable of being uniquely identified depends solely on the number of member contact elements 32 included. In the case of the preferred embodiment, four member contact elements 32 are provided. While a smaller or larger number of member contact elements may be provided as desired, four would appear to be an optimal number for a children's toy, as it allows for fairly large number of associated objects 50 while minimizing the complexity of the apparatus. As shown by configurations A–H in FIG. 5, the preferred embodiment includes eight possible combinations of object contact elements 54. Thus, the preferred embodiment of the invention is capable of identifying eight unique objects 50, each of which includes a pattern of object contact elements 54 corresponding to one of configurations A–H. By way of example, the contact element pattern shown in FIG. 4 corresponds to configuration C of FIG. 5. Each of the seven other possible elements associated with the preferred embodiment would have a configuration corresponding to another of those shown in FIG. 5.

The operation of fishing pole device 10 is preferably initiated by means of an on/off switch (not shown), which is actuated by the user. Fishing pole device 10 also includes audio, visual, and/or tactile output means 19, which provide cues to the user to identify a particular object 50 based on one or more identifying indicia 62 found on the object 50. This is accomplished by the user engaging hook member 16 with cavity 52 of the desired object 50. A typical cue might include an audio message generated by fishing pole device 10 requesting the user to "find the fish with the letter 'C'". The user then would select an object 50 by placing end 30 of hook member 16 within cavity 52 of the object 50. Depending on whether or not the user selected the correct object 50, fishing pole device 10 would then provide a particular output. If the user correctly selects the object 50 corresponding to the cue generated by output means 19, then a response would be generated by output means 19 indicating that the user has selected the correct object 50. For example, the response might take the form of "Good job! You found the fish with the letter 'C'." Similarly, if the user incorrectly selects an object 50 which does not correspond to the cue generated by output means 19, then a response would be generated by output means 19 indicating that the user has not selected the correct object 50. Such response would typically take the form of an audible cue advising the user of the identity of the object 50 which was selected, and instructing the user to "try again". Such a response might take the form of "That fish has the letter 'D' not 'C'. Try again."

The process by which an object is identified is set forth more clearly in the block diagram of FIG. 6. The process begins when the user places hook member 16 in proximity to cavity 52 of object 50. Object contact elements 54 are then brought into contact with member contact elements 32, due to the attractive force exerted on object contact elements 54 by magnet 36. Processing means 18 then generates an electrical signal, which signal is transmitted through conducting element 42 to hook member 16. The electrical signal then passes through member contact elements 32 and object contact elements 54 to form a complete circuit. A unique signal corresponding to the particular object 50 is then generated by circuit board 34, which signal is then transmitted to processing means 18 by means of conducting element 42. Based on the signal received by processing means 18, processing means 18 is able to determine which object 50 is engaged with hook member 16, by means known to those skilled in the art. Once the object 50 has been so identified, processing means 18 then transmits a signal to output means 19, which then generates an output corresponding to the identity of object 50, which may consist of audio, visual, and/or tactile output.

The foregoing description and drawings merely explain and illustrate the invention, and the invention is not limited thereto except insofar as the pending claims are so limited, as those skilled in the art and having the present disclosure before them will be able to make modifications and variations therein without departing from the scope of the invention.

What is claimed is:

1. An electronic children's educational toy comprising:
   a fishing pole device including a rod member and a hook member;
   a plurality of objects, each of said objects including a plurality of object contact elements wherein two or more of such contact elements are connected to one another to form a contact pattern which serves to uniquely identify each object, wherein each of said objects includes an aperture configured so as to accept engagement of said hook member when said hook member is placed in physical contact with said object;
   an identification member associated with said hook member, said identification member including a plurality of member contact elements configured such that at least two of said member contact elements come into electrical contact with at least two of said object contact elements when said hook member is placed in physical contact with one of said objects;
   a processing unit associated with said fishing pole device, wherein said processing unit is in direct electrical contact with said identification member and said processing unit is capable of detecting the object contact pattern in physical contact with said identification member, thereby determining the identification of the particular object in physical contact with said hook member.

2. The electronic children's educational toy according to claim 1, further comprising a means of providing information by at least one of audio, visual and tactile means, said information corresponding to the identification of the particular object in physical contact with said hook member.

3. The electronic children's educational toy according to claim 2, wherein the means of providing information by at least one of audio, visual and tactile means comprises computer-generated human speech.

4. The electronic children's educational toy according to claim 2, wherein the means of providing information by at least one of audio, visual or tactile means comprises movement of said hook member relative to said rod member.

* * * * *